No. 645,272. Patented Mar. 13, 1900.
W. SCHEU.
MOTOR CAR.
(Application filed May 8, 1899.)
(No Model.) 2 Sheets—Sheet 1.
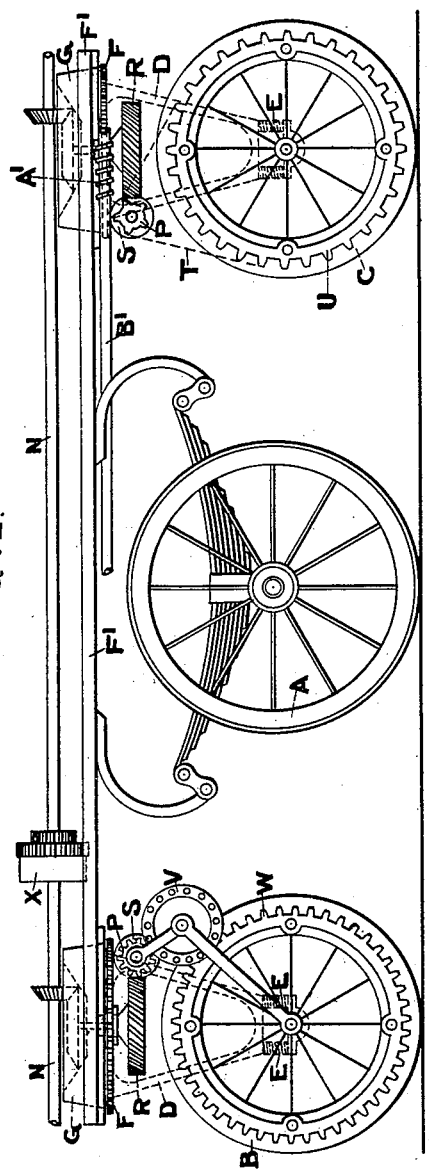
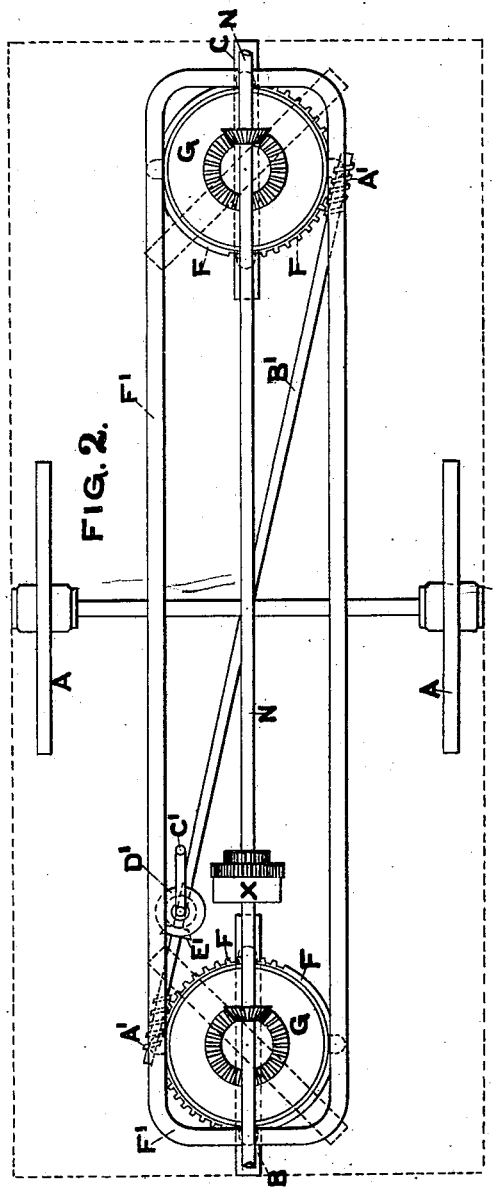
Witnesses
John W Walsh
Abm Reed
Inventor
William Scheu No. 645,272. Patented Mar. 13, 1900.
W. SCHEU.
MOTOR CAR.
(Application filed May 8, 1899.)
(No Model.) 2 Sheets—Sheet 2.

UNITED STATES PATENT OFFICE.

WILLIAM SCHEU, OF LEEDS, ENGLAND.

MOTOR-CAR.

SPECIFICATION forming part of Letters Patent No. 645,272, dated March 13, 1900.

Application filed May 8, 1899. Serial No. 715,955. (No model.)

*To all whom it may concern:*

Be it known that I, WILLIAM SCHEU, a subject of the Queen of Great Britain, residing at Leeds, in the county of York, England, have invented certain new and useful Improvements in or Relating to Motor-Cars, of which the following is a specification.

The object of my invention is to construct motor-cars so that they may be easily turned about their own centers and so that there is more control in steering than in the present construction.

Figure 3:
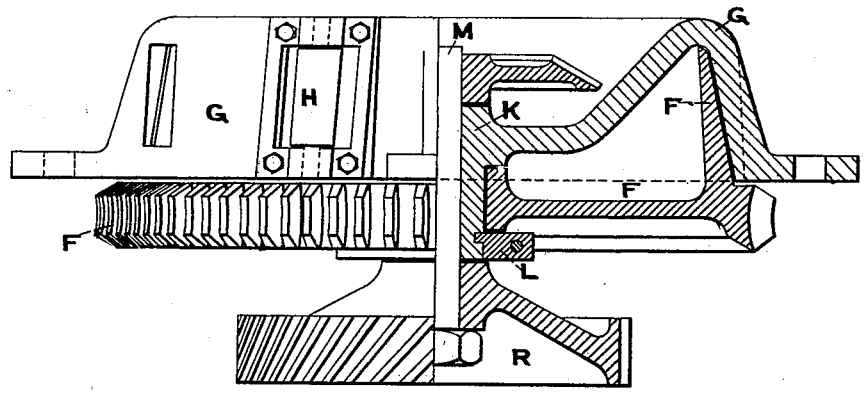
Figure 4:
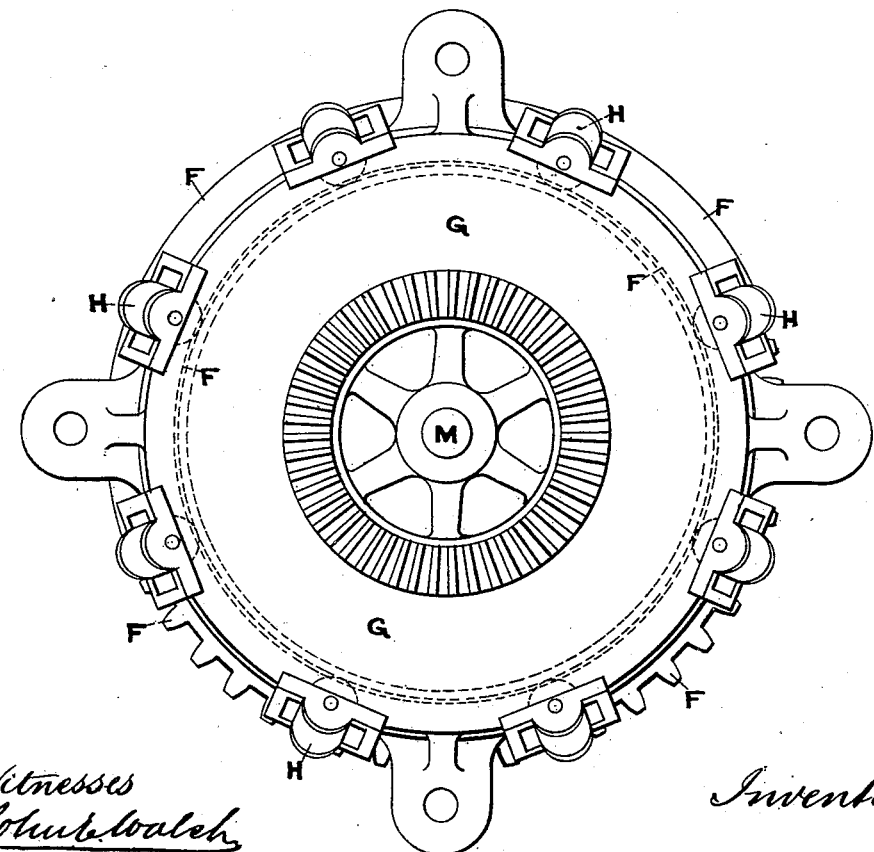

In the drawings, Figure 1 is a side elevation of my improved driving and steering gear for motor-cars. Fig. 2 is a plan of same. Fig. 3 is an enlarged elevation, half in section, of pivoting mechanism for front and back wheels. Fig. 4 is a plan of Fig. 3.

In carrying out my invention I construct the motor-car with wheels A A at each side in center and with front wheel B and back wheel C. Each of the said wheels B and C serves for both driving and steering and is mounted (by means of a suitable bracket D, with spiral springs E) on a turn-table or pivot-wheel F, which works in a fixed dished frame or casing G, with a series of antifriction-rollers H thereon. In Fig. 3 only one of these rollers is shown in position. The said casing G has a central sleeve or boss K, the turn-table F being mounted loosely on the said boss and being retained in position by a split collar L. The spindle M, which is driven from the main driving-shaft N by bevel-gearing, passes through and revolves within the said boss K, operating the pinion P by means of the skew-cut wheels R and S or by other suitable gearing. The said pinion P operates the driving-wheel by means of a chain T and a chain-wheel U on the felly, as shown applied to the back wheel C in Fig. 1, or by means of a pin-wheel V and spur-wheel W on the felly, as shown applied to the front wheel B in Fig. 1. The chain-wheel U or spur-wheel W on the felly of the driving-wheel may be protected by a suitable mud-guard.

The main driving-shaft N, from which the front and back wheels B and C are driven, is in two parts connected by differential gear X.

Upon preferably one-half of each turn-table F are teeth gearing with worms A' at each end of a diagonal shaft B', which is operated from the steering-handle C' by bevel-wheels D' and E', one of larger diameter than the other. By this means the driving-wheels B and C may be simultaneously turned in opposite directions as required in steering, as shown by dotted lines in Fig. 2, without interfering with the driving mechanism or causing any extra strain on the said driving-wheels.

The casings G G, carrying the steering-gear, are bolted to a suitable steel frame F', which is secured to the body of the car in any suitable manner.

The skew-wheels R R are preferably dished to give greater clearance and allow for springing of the driving-wheels.

My improved gear enables the car to be turned in any required radius, or when the wheels B and C are in their extreme position—that is, at right angles to the body of the car—it may be turned about its own center without any forward or backward movement.

What I claim as my invention, and desire to secure by Letters Patent, is—

1. In a motor-car, the combination, with a frame, and a pair of wheels journaled at the middle part of the frame one on each side thereof; of two combined driving and steering wheels B and C pivoted on substantially vertical axes one at each end of the frame under the middle part thereof, driving mechanism operating to revolve the wheels B and C simultaneously, and separate driving mechanism operating to turn the wheels B and C on their axes simultaneously, substantially as set forth.

2. In a motor-car, the combination, with a frame, and a casing secured to the frame and provided with a central sleeve; of a turn-table journaled concentric with the said sleeve, antifriction devices interposed between the said turn-table and casing, a single combined driving and steering wheel supported by the said turn-table, a driving-shaft passing through the said sleeve, driving mechanism operating to revolve the said wheel from the said shaft, and means for moving the said turn-table and wheel on the axis of the said sleeve, substantially as set forth.

3. In a motor-car the combination of the fixed casing G, having a central sleeve K, the central driving-spindle M, the skew gear-wheels R and S (or like mechanism), the pinion P, the toothed turn-table F carrying the driving-wheel bracket D, the antifriction-rollers H, the split collar L, and the chain T, with chain-wheel U (or equivalent device), all arranged and operated substantially as, and for the purposes, shown and described.

In witness whereof I have hereunto set my hand in presence of two witnesses.

WILLIAM SCHEU.

Witnesses:
JOHN E. WALSH,
ALLAN BENNETT.